(12) United States Patent
Pettersson

(10) Patent No.: US 7,591,077 B2
(45) Date of Patent: Sep. 22, 2009

(54) COORDINATE MEASURING MACHINE

(75) Inventor: Bo Pettersson, Holmtorpsvägen (SE)

(73) Assignee: Hexagon Metrology AB, Nacka Strand (SE)

( * ) Notice: Subject to any disclaimer, the term of this patent is extended or adjusted under 35 U.S.C. 154(b) by 81 days.

(21) Appl. No.: 11/587,273

(22) PCT Filed: Apr. 14, 2005

(86) PCT No.: PCT/SE2005/000540

§ 371 (c)(1),
(2), (4) Date: Dec. 21, 2006

(87) PCT Pub. No.: WO2005/103603

PCT Pub. Date: Nov. 3, 2005

(65) Prior Publication Data

US 2007/0220767 A1 Sep. 27, 2007

(30) Foreign Application Priority Data

Apr. 27, 2004 (SE) .................................... 0401085

(51) Int. Cl.
*G01B 5/004* (2006.01)
(52) U.S. Cl. .......................... 33/503; 33/1 M; 33/556; 73/1.81
(58) Field of Classification Search .................. 33/503, 33/1 M, 555–561, 502; 73/1.79, 1.81
See application file for complete search history.

(56) References Cited

U.S. PATENT DOCUMENTS

| | | | |
|---|---|---|---|
| 3,286,353 A * | 11/1966 | Potter ........................... 33/503 |
| 3,749,501 A | 7/1973 | Wieg ........................... 356/619 |
| 3,750,295 A * | 8/1973 | Nordmann et al. ............ 33/548 |
| 3,911,731 A * | 10/1975 | Walker et al. .................. 73/660 |
| 4,133,112 A | 1/1979 | Matthiessen .................. 33/1 M |
| 4,630,381 A * | 12/1986 | Sakata et al. ................... 33/503 |
| 4,766,674 A * | 8/1988 | Zanier et al. ................... 33/503 |
| 5,257,461 A * | 11/1993 | Raleigh et al. ................. 33/503 |
| 5,291,662 A * | 3/1994 | Matsumiya et al. ........... 33/503 |
| 5,388,343 A * | 2/1995 | Garau et al. ................... 33/503 |
| 5,621,978 A * | 4/1997 | Sarauer ........................ 33/503 |
| 5,758,429 A * | 6/1998 | Farzan et al. .................. 33/503 |
| 6,161,298 A | 12/2000 | Bernhardt et al. ............. 33/702 |
| 6,370,787 B1 * | 4/2002 | Kikuchi ....................... 33/503 |

* cited by examiner

*Primary Examiner*—Amy Cohen Johnson
(74) *Attorney, Agent, or Firm*—Young & Thompson

(57) ABSTRACT

A coordinate measuring machine to determine the coordinates of a number of points on the surface of a measured object, includes a support beam, supporting a measuring head over the surface of a support table that supports the test object. The measuring machine is constructed from separately manufactured units, which include at least a support beam, a measurement trolley and a measurement head. The support beam supports the measurement trolley, which is displaceable along the support beam. The measurement trolley in turn supports the measurement head. The beam, head and trolley are individually calibrated, and the trolley includes both mechanical and electrical attachment points for the head and the beam, where the mechanical attachment points are designed such that no geometric deformation can take place when these units are joined together such that the units, which have been individually manufactured, can be simply joined to the coordinate measuring machine.

17 Claims, 5 Drawing Sheets

COORDINATE MEASURING MACHINE

BACKGROUND OF THE INVENTION

1. Field of the Invention

Figure 1:
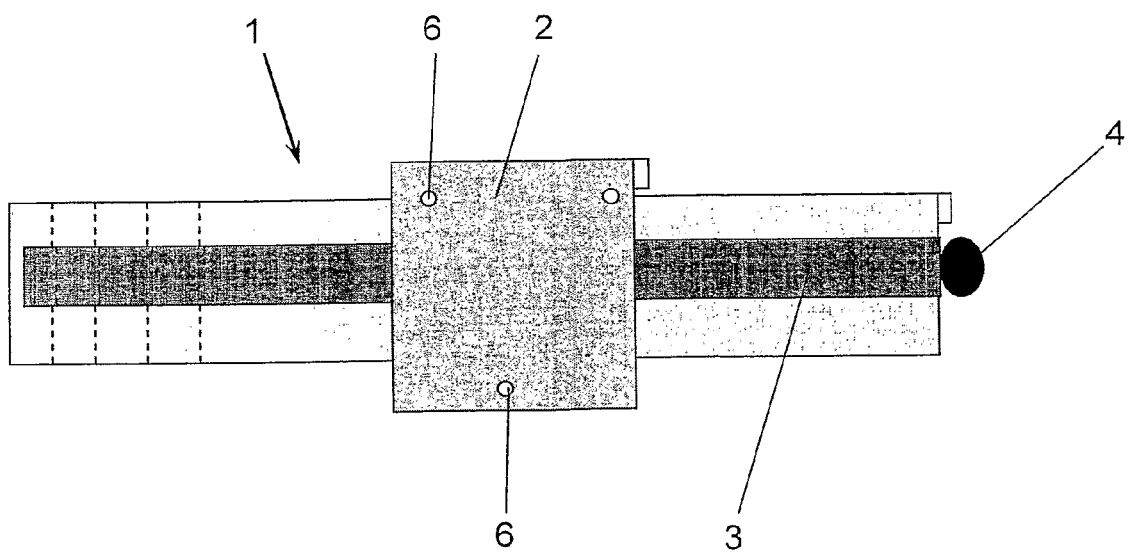

The present invention relates to a coordinate measuring machine, in particular to a portal measuring machine.

2. Description of the Related Art

Coordinate measuring machines are used to determine with high precision the coordinates of a number of points on the surface of a measured object in order in this way to determine the appearance and the dimensions of the measured object. Coordinate measuring machines for the accurate measurement of objects in a coordinate system normally comprise a support table on which the object that is to be measured is placed and a pair of pillars that support a support beam that in turn supports a measuring probe that can be brought into contact with the object that is to be measured.

Coordinate measuring machines of this type are of a very stable construction and the assembled elements are carefully calibrated. The machines are normally available in several sizes in which the component elements are dimensioned and adapted to each other for the relevant size of the machine. An example of such a coordinate measuring machine is revealed in the U.S. Pat. No. 3,749,501.

It is therefore an aim of the present invention to achieve a coordinate measuring machine of the type described above in which the component elements are designed such that a desired coordinate measuring machine can be simply constructed from standardised units to give the desired coordinate measuring machine.

While it is known, through, for example, EP-0523906-A1, to arrange a measurement probe for a coordinate measuring machine such that it can be exchanged; this probe is arranged in what is otherwise a conventionally constructed coordinate measuring machine.

BRIEF SUMMARY OF THE INVENTION

The aim described above is achieved with a coordinate measuring machine that is constructed from separately manufactured units, which units comprise at least a support beam, a measurement trolley and a measurement head, and where the support beam supports the measurement trolley, which is arranged such that it can be displaced along the support beam, which measurement trolley in turn supports the measurement head, where, according to the invention, the units are individually calibrated, where the measurement trolley comprises both mechanical and electrical attachment points for the measuring head and the support beam, where the mechanical attachment points are designed such that no geometric deformation can take place when the units are joined together such that the units, which have been individually manufactured, can be simply joined together to the coordinate measuring machine.

According to a further embodiment of the invention, a pillar supporting the support beam is designed such that it comprises a base pillar together with one or several possible supplementary pillars, whereby the base pillar and the supplementary pillars are arranged to be simply joined together to form one pillar, and that the base pillar and the supplementary pillars are individually calibrated.

BRIEF DESCRIPTION OF THE DRAWINGS FIGURES

Figure 2:
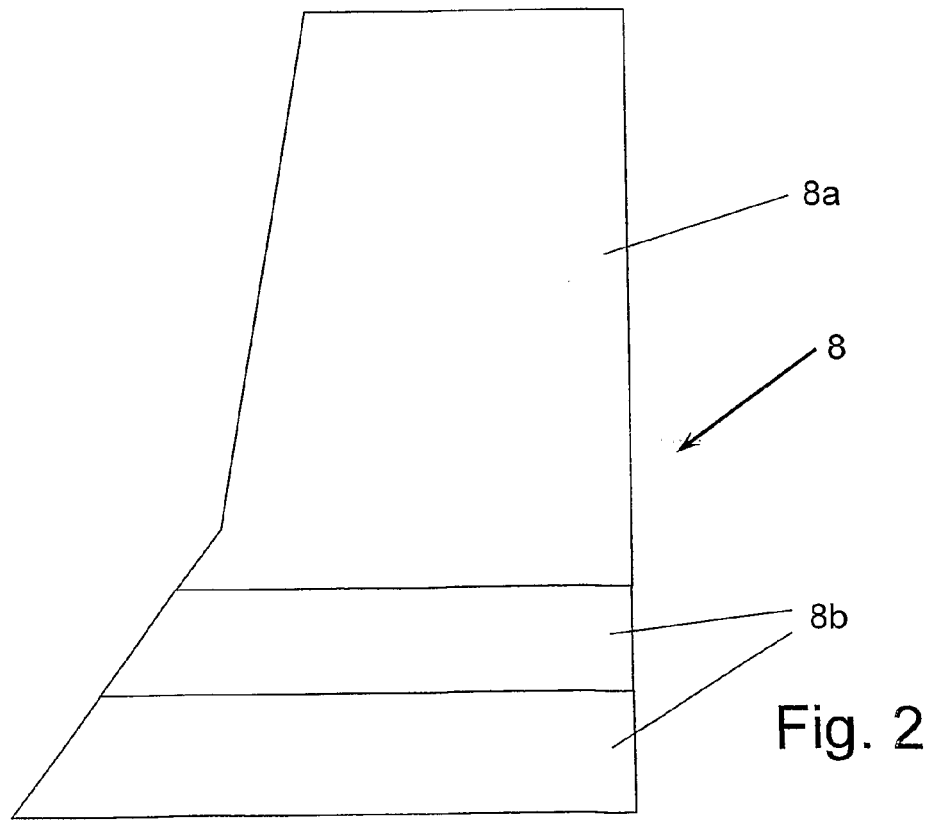
Figure 3:
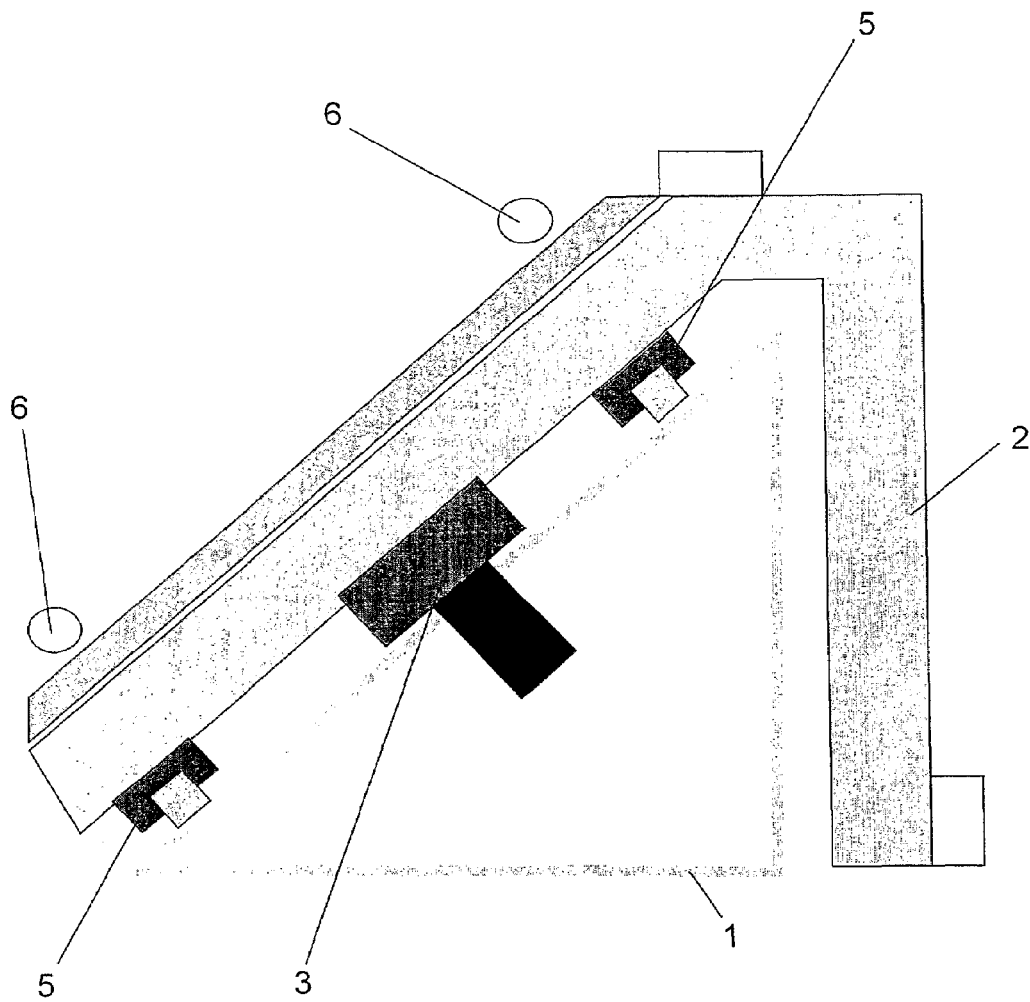
Figure 4:
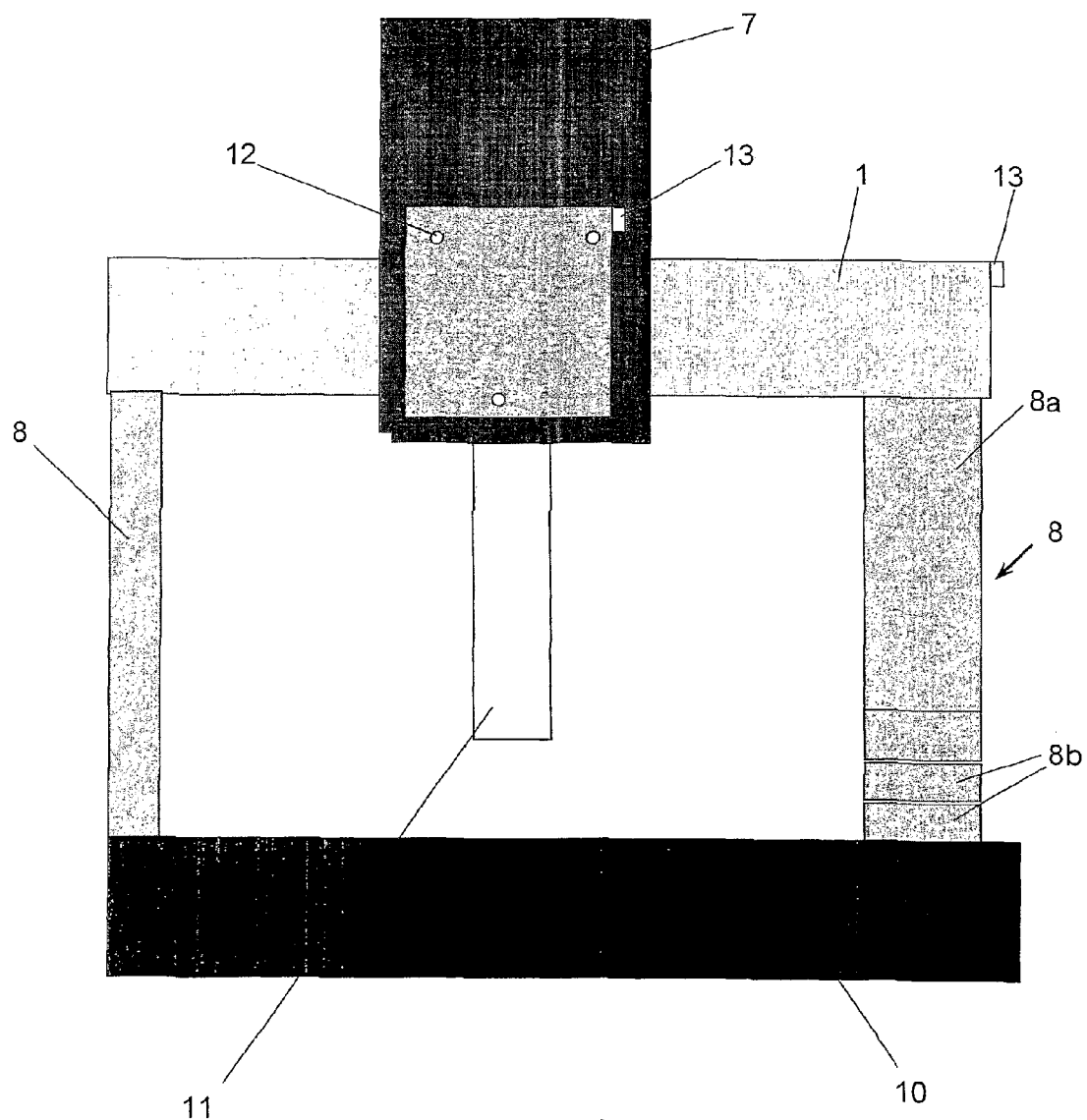
Figure 5:
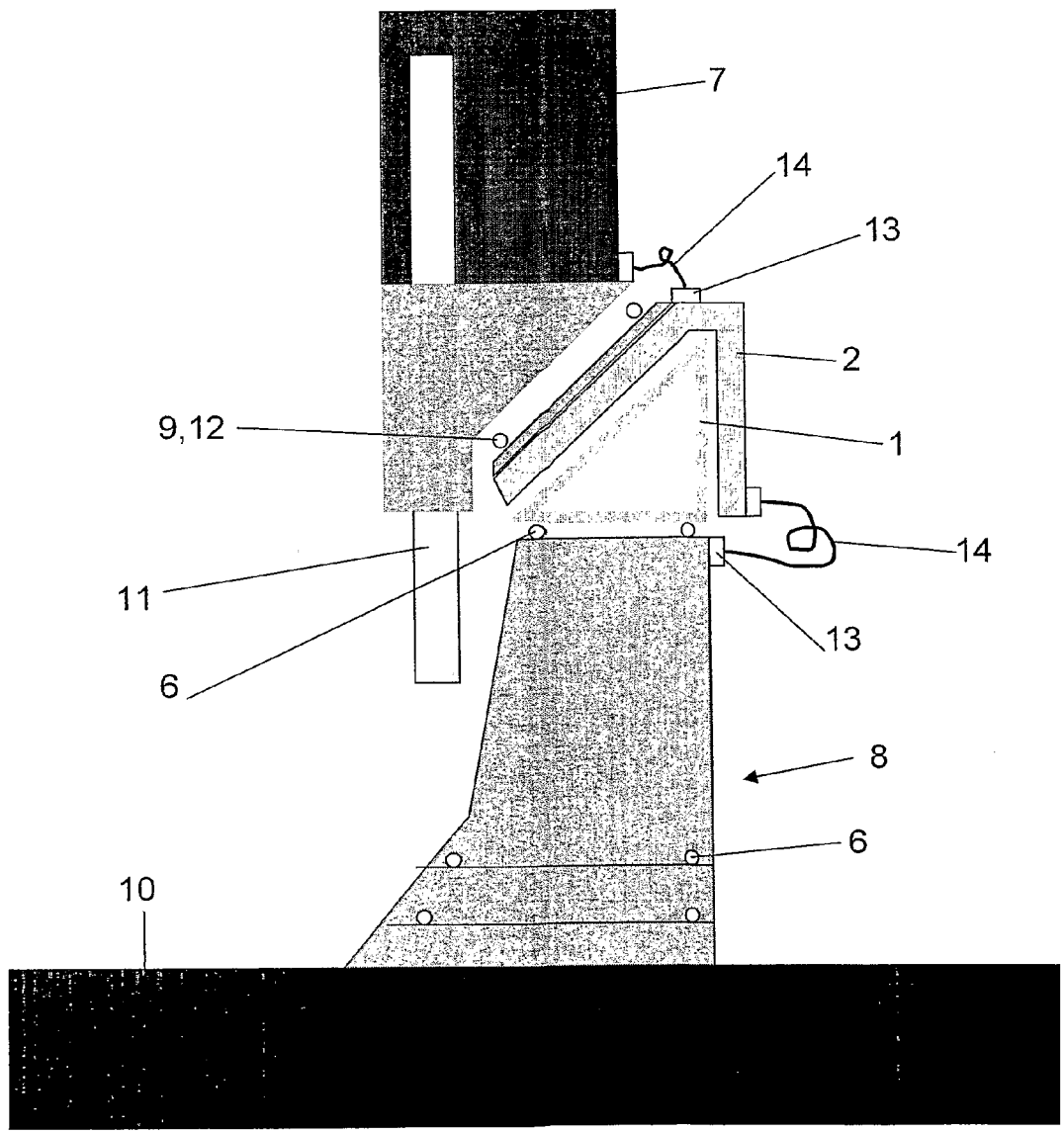
Figure 6:
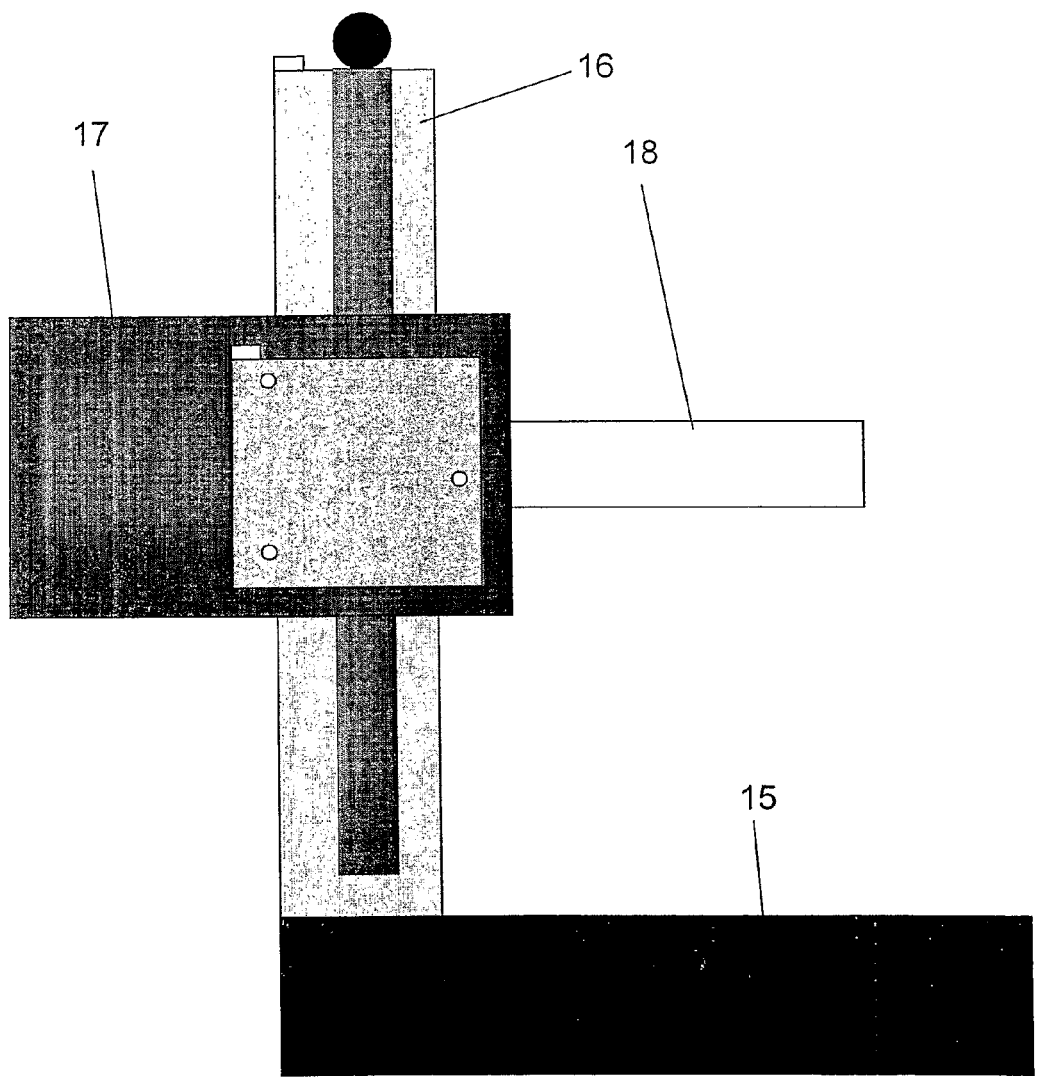

The invention will now be described in more detail in the form of two non-limiting embodiments, visualised with the aid of the attached drawings, where FIG. 1 shows schematically a plan view of a support beam with the measuring trolley for a coordinate measuring machine according to the invention mounted upon it, FIG. 2 shows a side view of a pillar for a coordinate measuring machine according to the invention, FIG. 3 shows an end view of the support beam with the measuring trolley according to FIG. 1, FIG. 4 shows a schematic frontal view of a coordinate measuring machine in the form of a portal measuring machine designed in agreement with the invention, FIG. 5 shows a side view of a coordinate measuring machine according to FIG. 4, and FIG. 6 shows a schematic frontal view of a coordinate measuring machine according to the invention in the form of a horizontal arm machine.

DETAILED DESCRIPTION OF THE PREFERRED EMBODIMENTS

Thus a support beam 1 for a coordinate measuring machine is shown in FIG. 1, which support beam according to the invention is manufactured in various standardised lengths, such as has been suggested with the aid of the dashed lines across the support beam. The support beam 1 supports a measuring trolley 2 that can be displaced/translated along the beam. The support beam 1 may comprise driving means 3 for displacing the measuring trolley 2 along the beam. The driving means 3 may be manually driven, by, for example, a hand crank 4, or it may be driven by a motor, such as an electric motor.

As is made clear in FIG. 3, it is appropriate that the support beam 1 has a principally triangular cross-section, and that the measuring trolley 2 runs along the surface of the support beam 1 with the aid of mechanical ball bearings 5 or air bearings. The measuring trolley 2 comprises three calibrated attachment points 6 for the attachment of a measuring head 7 onto the measuring trolley 2 and thus to the support beam 1. The measuring head 7 will be described in more detail below.

FIG. 2 shows a pillar 8 for a coordinate measuring machine according to the invention. This pillar 8 comprises a basic pillar 8a, and, in the current case, two supplementary pillars 8b. The basic pillar 8a and the supplementary pillars 8b comprise three calibrated attachment points 9 for the joining together of the basic pillar 8a and any supplementary pillars 8b required, and the basic pillar 8a also comprises three calibrated attachment points for the support of a support beam 1 on the pillar 8, see FIG. 5.

FIG. 4 shows an example of how a coordinate measuring machine in the form of a portal measuring machine may be designed. It then comprises a support table 10, in the form, for example, of a carefully prepared granite slab, which can not only support the object that is to be measured but also support the coordinate measuring machine itself. The portal measuring machine that is shown in FIG. 4 comprises two pillars 8, supporting the support beam 1 that passes transversely over the support table. The figure makes it clear that the right column is composed of a basic pillar 8a and two supplementary pillars 8b. The number of supplementary pillars that are used depends on the distance that is required between the support table 10 and the support beam 1 for the measurements that are intended to be carried out using the particular coordinate measuring machine. The length of the support beam 1 is chosen taking into consideration the objects that are intended to be measured in the coordinate measuring machine, and an adaptation to the distance between the pillars 8 can thus be carried out by selecting a suitable standard length of the support beam 1. A measuring head 7 is mounted on the measuring trolley 2 of the support beam 1, which measuring head can be translated along the support beam 1 with the aid of the measuring trolley 2. The measuring head 7 comprises in a known manner a measuring arm 11, that, also in a known manner, supports at its free end a measurement probe, not shown in the drawing. The measuring arm 11 can be displaced upwards and downwards in the measuring head in order to enable the measuring probe to be brought into contact with the object that is to be measured. The measuring head 7 comprises three attachment points 12, with the aid of which the measuring head can be attached to the three calibrated attachment points 6 of the measuring trolley 2, in order to obtain an exact relative placement.

The measuring head 7 is available in different sizes, mainly with respect to the length of the measuring arm 11, such that an adaptation to the height of the pillars 8 can be made. All measuring heads 7, independently of their sizes, have their three attachment points 12 located in the same manner and calibrated such that any measuring head can interact with any measuring trolley and any support beam.

FIG. 5, which shows a side view of a coordinate measuring machine according to the invention, makes it clear, among other things, how the component parts of the coordinate measuring machine are joined to form a collaborating unit with the aid of the calibrated attachment points 6, 9, 12. The figure also makes it clear that the different components also comprise electronic outlets 13, which can transfer the measurement results between the components with the aid of transfer cables 14, and subsequently to a unit that displays/records the measurement results obtained.

FIG. 6 shows an alternative design of a coordinate measuring machine according to the invention, in the form, in this case, of a horizontal measuring machine. This comprises a support table 15, on which a support beam 16 is vertically mounted. The support beam 16 supports via a measuring trolley a measuring head 17 with a measuring arm 18. It is possible in this case to move/translate the measuring head 17 along the support beam 16 in the vertical direction, and the measuring arm 18 can be displaced in the horizontal direction in order to be able, via a measurement probe, not shown in the drawing, to make contact with an object supported by the support table 15. The support beam 16 may be designed in the same manner as the support beam 1 described above, and thus it may be available in various standard lengths. The measuring head 17 can, in an equivalent manner, also be available in different sizes, such that it can be adapted to the size of the support table 15 used, and to the objects that are intended to be measured with the aid of the coordinate measuring machine. The units that are component parts of the coordinate measuring machine are independently calibrated, in the manner that has been described above, and this makes it possible once they have been joined to carry out relatively easily a total calibration of the complete coordinate measuring machine.

By making a coordinate measuring machine according to the invention such that it is composed of a number of basic units and supplementary units, it is possible with a relatively small number of parts to be able to join these to form a wide range of coordinate measuring machines of different sizes. A support beam according to the invention, for example, may be available in up to six different standardised lengths, which makes it possible, for example, to supply a range of support beams with lengths from, for example, 500 mm up to 1,500 mm, in intervals of 200 mm. The same applies also to columns and measuring heads, and this means that these parts can be manufactured in large quantities, subsequently to be joined as required to produce a coordinate measuring machine of the desired dimensions.

The measured/calibrated data for the various parts from which a coordinate measuring machine has been constructed can be stored, for example, on CD-ROM disks, or on other storage media, and they can accompany the parts concerned, in order to be used in association with assembly of a coordinate measuring machine for the final calibration of the assembled coordinate measuring machine.

The idea of joining separately manufactured, standardised units to produce a coordinate measuring machine according to the invention can be used for many different types of Cartesian coordinate measuring machines, such as those known as bridge, horizontal arm, gantry, cantilever, half-bridge, etc.

The invention claimed is:

1. A coordinate measuring machine to determine the coordinates of a number of points on a surface of a measured object, comprising:
    separately manufactured and individually calibrated units (1, 16; 2; 7, 17), the units comprising:
        a support beam (1; 16);
        a measurement trolley (2);
        at least one measurement head (7; 17); and
        a support table (10; 15) configured to support a test object for which the coordinates are to be determined,
    wherein the support beam (1; 16) supports the at least one measurement head (7; 17) over a surface of the support table (10; 15), the support beam (1; 16) supports the measurement trolley (2) such that the measurement trolley (2) can be displaced along the support beam, and the measurement trolley (2) supports the at least one measurement head (7; 17), and wherein
    the measurement trolley (2) comprises both calibrated mechanical (6, 12) and calibrated electrical (13) attachment points for the at least one measuring head (7; 17) and the support beam (1; 16), where the mechanical attachment points are configured such that no geometric deformation can take place when the units are joined together such that the units can be joined together to the coordinate measuring machine.

2. The coordinate measuring machine according to claim 1, wherein the mechanical attachment (6, 12) comprises three calibrated attachment points.

3. The coordinate measuring machine according to claim 2, wherein the at least one measurement head (7; 17) is arranged such that the at least one measurement head (7; 17) incorporates at least one measurement arm (11; 18) that can be displaced relative to the at least one measurement head (7; 17).

4. The coordinate measuring machine according to claim 3, wherein the at least one measurement head (7; 17) with the at least one measurement arm (11; 18) comprises a plurality of measurement heads (7; 17) and measurement arms (11; 18) each having a different size and/or dimension and arranged such that each of the plurality of measurement heads (7; 17) can be joined to the measurement trolley (2).

5. The coordinate measurement machine according to claim 2, wherein the support beam (16) is arranged extending vertically upwards from the support table (15).

6. The coordinate measuring machine according to claim 1, wherein the at least one measurement head (7; 17) is arranged such that the at least one measurement head (7; 17) incorporates at least one measurement arm (11; 18) that can be displaced relative to the at least one measurement head (7; 17).

7. The coordinate measuring machine according to claim 6, wherein the at least one measurement head (7; 17) with the at least one measurement arm (11; 18) comprises a plurality of measurement heads (7; 17) and measurement arms (11; 18) each having a different size and/or dimension and arranged such that each of the plurality of measurement heads (7; 17) can be joined to the measurement trolley (2).

8. The coordinate measuring machine according to claim 7, wherein the support beam (16) is arranged extending vertically upwards from the support table (15).

9. The coordinate measuring machine according to claim 6, wherein the support beam (16) is arranged extending vertically upwards from the support table (15).

10. The coordinate measuring machine according to claim 1, wherein the coordinate measuring machine also comprises at least one pillar (8) supporting the support beam (1) at a distance over the support table (10), whereby the pillar comprises a basic pillar (8a) or a basic pillar (8b) and several supplementary pillars (8b), whereby the basic pillar (8a) and the supplementary pillars (8b) are arranged such that they can be easily joined to one pillar (8), and that the basic pillar (8a) and the supplementary pillars (8b) are independently calibrated.

11. The coordinate measuring machine according to claim 1, wherein the support beam (16) is arranged extending vertically upwards from the support table (15).

12. The coordinate measuring machine according to claim 1, wherein electronic outlets (13) connected by transfer cables (14) are arranged to transfer the measurement results between different parts that are included in the coordinate measuring machine.

13. A coordinate measuring machine to determine the coordinates of a number of points on a surface of a measured object, comprising:
    separately manufactured and individually calibrated units (1, 16; 2; 7, 17), the units comprising:
        a support beam (1; 16);
        a measurement trolley (2);
        at least one measurement head (7; 17); and
        a support table (10; 15) configured to support a test object for which the coordinates are to be determined,
    wherein the support beam (1; 16) supports the at least one measurement head (7; 17) over a surface of the support table (10; 15), the support beam (1; 16) supports the measurement trolley (2) such that the measurement trolley (2) can be displaced along the support beam, and the measurement trolley (2) supports the at least one measurement head (7; 17), and wherein
    the measurement trolley (2) comprises both calibrated mechanical (6, 12) and calibrated electrical (13) attachment points for the at least one measuring head (7; 17) and the support beam (1; 16), where the mechanical attachment points are configured such that no geometric deformation can take place when the units are joined together such that the units can be simply joined together to the coordinate measuring machine,
    the at least one measurement head (7; 17) is arranged such that the at least one measurement head (7; 17) incorporates a at least one measurement arm (11; 18) that can be displaced relative to the at least one measurement head (7; 17), and
    the support beam (16) is arranged extending vertically upwards from the support table (15).

14. The coordinate measuring machine according to claim 13, wherein the mechanical attachment (6, 12) comprises three calibrated attachment points.

15. The coordinate measuring machine according to claim 14, wherein the at least one measurement head (7; 17) with the at least one measurement arm (11; 18) comprises a plurality of measurement heads (7; 17) and measurement arms (11; 18) each having a different size and/or dimension and arranged such that each of the plurality of measurement heads (7; 17) can be joined to the measurement trolley(2).

16. The coordinate measuring machine according to claim 13, wherein the at least one measurement head (7; 17) with the at least one measurement arm (11; 18) comprises a plurality of measurement heads (7; 17) and measurement arms (11; 18) each having a different size and/or dimension and arranged such that each of the plurality of measurement heads (7; 17) can be joined to the measurement trolley (2).

17. The coordinate measuring machine according to claim 13, wherein electronic outlets (13) connected by transfer cables (14) are arranged to transfer the measurement results between different parts that are included in the coordinate measuring machine.

* * * * *